US011138567B1

(12) United States Patent
Schmoldt et al.

(10) Patent No.: US 11,138,567 B1
(45) Date of Patent: Oct. 5, 2021

(54) ENTERPRISE INTEGRATED CALENDAR AND EVENT MANAGEMENT SYSTEMS AND METHODS

(71) Applicant: UIPCO, LLC, San Antonio, TX (US)

(72) Inventors: Amanda Schmoldt, San Antonio, TX (US); Robin Gandy, Fair Oaks Ranch, TX (US); Anthony Bishop, Fair Oaks Ranch, TX (US); Bethany Quinn, Fair Oaks Ranch, TX (US); Bret Perko, Canyon Lake, TX (US); Gay Meyer, Phoenix, AZ (US); Philana Hudspeth, Fair Oaks Ranch, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 707 days.

(21) Appl. No.: 15/433,223

(22) Filed: Feb. 15, 2017

Related U.S. Application Data

(60) Provisional application No. 62/295,686, filed on Feb. 16, 2016.

(51) Int. Cl.
*G06Q 10/10* (2012.01)
*G06Q 10/06* (2012.01)

(52) U.S. Cl.
CPC ... *G06Q 10/1095* (2013.01); *G06Q 10/06393* (2013.01)

(58) Field of Classification Search
None
See application file for complete search history.

(56) References Cited

U.S. PATENT DOCUMENTS

| 6,519,763 | B1 * | 2/2003 | Kaufer | G06Q 10/109 |
| | | | | 706/21 |
| 2011/0212422 | A1 * | 9/2011 | O'Donnell | G09B 7/02 |
| | | | | 434/236 |

(Continued)

FOREIGN PATENT DOCUMENTS

WO    WO-2008025118 A1 *  3/2008  ........... G06Q 10/109

OTHER PUBLICATIONS

Reference James A. Westwood et al. Work-Life Optimization: Using Big Data and Analytics to Facilitate Work-Life Balance. 2016 49th Hawaii International Conference on System Sciences (HICSS) (pp. 1701-1709). Mar. 7, 2016. (Year: 2016).*

*Primary Examiner* — Patricia H Munson
*Assistant Examiner* — Nancy N Prasad
(74) *Attorney, Agent, or Firm* — Perkins Coie LLP

(57) ABSTRACT

Methods and systems described in this disclosure receive, from a device, information associated with an activity for input into an enterprise integrated calendar, including a start date of the activity, a completion date of the activity, and a resource expected to be impacted by the activity from the start date to the completion date. Based on the start and completions dates and the resource impacted, a change impact score for the activity can be determined. A saturation score (or a series of saturation scores) for the resource can be generated from the start date to the completion date based on the change impact score for the activity and change impact scores of other activities. Such scores can provide information about whether the activity should remain on the enterprise calendar or be moved to a different date where the saturation scores do not exceed certain saturation levels.

20 Claims, 13 Drawing Sheets

(56) References Cited

U.S. PATENT DOCUMENTS

2014/0372184 A1\* 12/2014 Blumenthal ....... G06Q 30/0217
705/7.41
2016/0104076 A1\* 4/2016 Maheshwari .......... G06N 20/00
706/12

\* cited by examiner

ENTERPRISE INTEGRATED CALENDAR AND EVENT MANAGEMENT SYSTEMS AND METHODS

CROSS-REFERENCE TO RELATED APPLICATIONS

This application is a non-provisional of and claims priority to U.S. Provisional Application No. 62/295,686, filed on Feb. 16, 2016, entitled "ENTERPRISE INTEGRATED CALENDAR AND EVENT MANAGEMENT SYSTEMS AND METHODS," which is hereby incorporated by reference in its entirety for all purposes.

TECHNICAL FIELD

Various embodiments of the present disclosure generally relate to calendars. More specifically, various embodiments of the present disclosure relate to enterprise integrated calendar and event management systems and methods.

BACKGROUND

Organizations can have numerous calendars and tracking systems. Duplications of events or efforts may not be recognized and managed, resulting in resources that are not efficiently used. For example, two groups may be working on different solutions to the same problem. Moreover, employees and customers may have frustrating experiences. For example, a fire drill may be planned on the same day that customers are scheduled to visit.

BRIEF DESCRIPTION OF THE DRAWINGS

Embodiments of the present disclosure will be described and explained through the use of the accompanying drawings in which.

DETAILED DESCRIPTION

Figure 1:
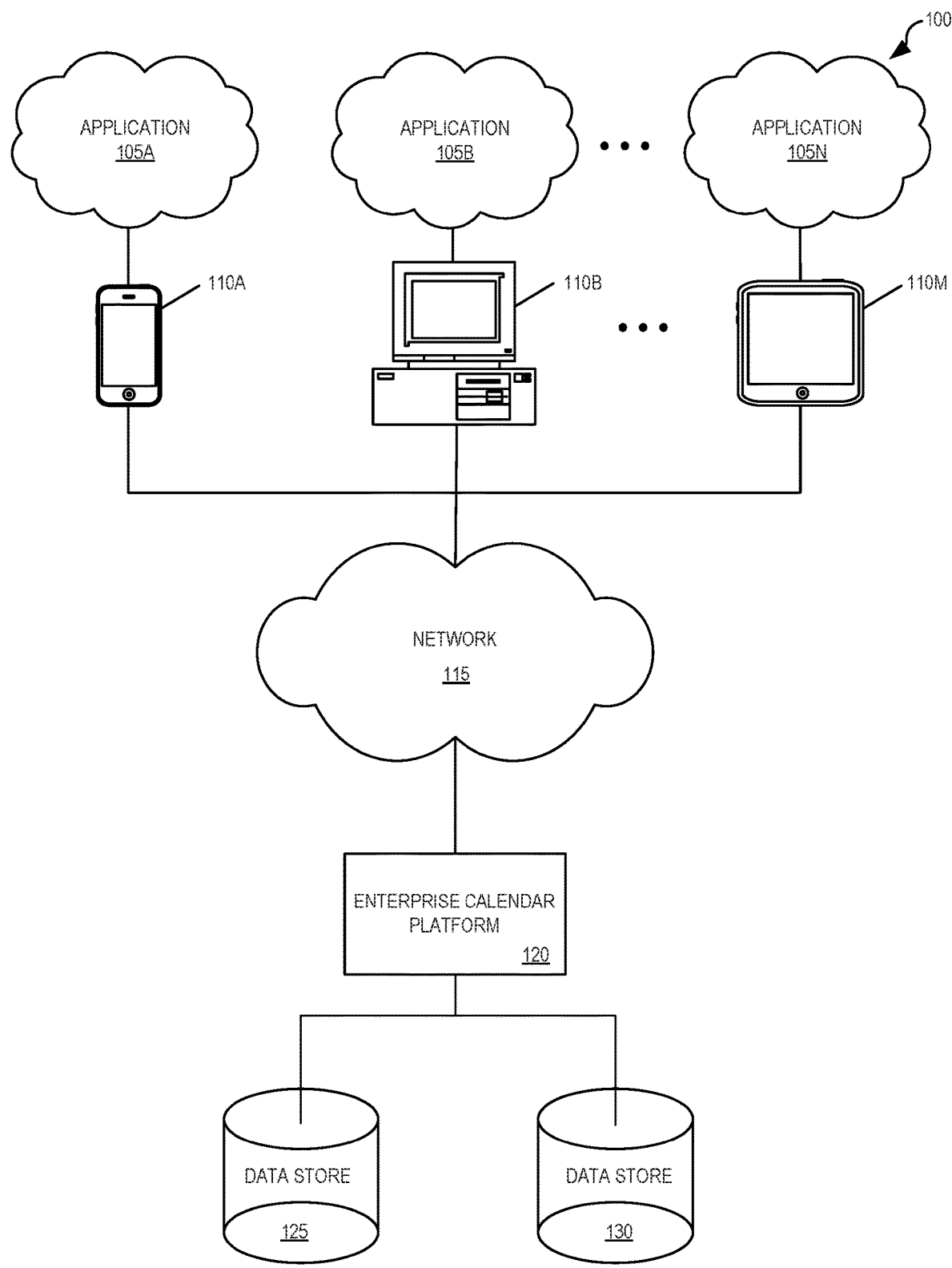
FIG. 1 illustrates an example of a network-based operating environment in accordance with various embodiments of the disclosure.

Various embodiments of the present disclosure generally relate to calendars. More specifically, various embodiments of the present disclosure relate to enterprise integrated calendar and event management systems and methods.

Organizations can have numerous calendars and tracking systems. Each different group may have one or more dedicated calendars. Many events or items calendared on one group's calendar would be valuable for another group to have on their calendar. Duplications of events or efforts may not be recognized and managed, resulting in misinformation or resources that are not efficiently used. For example, some calendars may be updated with new information while the same event on a different calendar is not updated, potentially leading some user's astray. In another example, two groups may be working on different solutions to the same problem, which may be detected with an enterprise-level calendar.

Not having an enterprise calendar may lead to frustrating experiences for employees and customers. For example, an enterprise calendar may help identify that a fire drill is planned on the same day that customers are scheduled to visit. In another example, an enterprise calendar may show that a particular group is going to experience a high volume of changes. A wholistic organization calendaring process and system described herein can efficiently manage an organization's activities and events. Moreover, the calendaring methods and systems described herein can assess the likely impact of an activity on a particular resource, including the cumulative impact of other activities planned during the timeframe of the activity.

Calendar items may be added to an enterprise calendar through a calendar item approval process. During the process, the user may identify, or the system may determine, a type of calendar item such as a visiting dignitary, operational activity, event, or change impact activity. The system can receive information about the calendar item and, in some embodiments, determine whether the event should be added to the enterprise calendar and who should have the ability to view the event if it is added. In some embodiments, only certain groups can see certain types of events (e.g., typical employees can see when healthcare benefits may change but will not be able to see when a fire drill is planned).

Calendar items, and particularly calendar items that are labeled as "change impact activities" because they are expected to have an impact on resources (e.g., projects that will take significant employee time, an upgrade of a system that will affect communications between groups or with customers) can be assessed to determine a likely impact the calendar item will have on resources (e.g., group, subgroup, department, enterprise, division, funds, building space). In some embodiments, regardless of how the calendar item is classified, the calendar item is assessed for an expected amount of change that resources will experience, whereas in other embodiments, only certain calendar items are assessed for their level of impact on resources.

To assess an amount of impact, information such as a start date, completion date, or identification of resources predicted to be affected may be identified by a user or gathered from an existing calendar. Several start and completion dates may be entered by the user for different phases of the activity, and each different phase may be separately assessed for the expected impact. The user may be asked a series of questions about the calendar item or activity, and the answer to each question may be scored. A change impact score may then be generated for the activity based on the scored answers. The change impact score may be used to classify the activity as a high, medium, or low impact event.

A saturation score, or a series of saturation scores, can be determined based on the activity and the other activities/events/holidays expected from the start date to the completion date. For example, during a period where a group is predicted to be extremely busy with several high impact events as well as planned vacations from employees in the group, the saturation score may be high because the change impact scores of each activity during the time period are high and because several employees will not be available.

The saturation scores can be compared with a saturation level for the resource. The saturation level can represent the level at which behaviors suggesting the employees are not happy are exhibited. Identified behaviors may include behaviors such as employees leaving the organization, taking a position in a different group within the organization, applying for a different job, taking an unplanned vacation, and exhibiting irregular workplace patterns. The identified behaviors can be determined from examining workplace metrics, monitoring employee in/out times, reviewing employee surveys, and monitoring employee's website searches.

When the saturation scores(s) is below the saturation level, the activity may be added to the enterprise calendar (e.g., by linking the activity from one calendar to the enterprise calendar). When the saturation score is above the saturation level, however, the saturation scores may be regenerated using alternative dates so that that saturation level of the group is not as high during the dates that were initially specified.

In some embodiments, the saturation scores can be displayed on a timeline from the start date to the completion date for a resource. Additionally, in some embodiments, the saturation level can also be displayed on the timeline. When the saturation scores are at or above the saturation level, alternative dates can be determined so that the saturation score does not exceed the saturation level. The saturation scores can be relocated in the display on the timeline from the new start date to the new completion date. When the saturation scores do not exceed the saturation level, the calendar item can be added to the enterprise calendar. In some embodiments, the calendar item can be added even though the saturation score is high. In such cases, management can understand the amount of work or changes the group will be experiencing during the time and can better prepare the group or can arrange for some items to be changed to a different period of time.

In some embodiments, access and/or visibility to certain events can be limited. For example, the company can limit access to sensitive events, activities, or projects in cases where the event may cause unnecessary worrying on anxiety (e.g., project to investigate alternative health care providers).

In some embodiments, saturation scores can be calculated for customers, a division or unit of the workforce, the entire workforce, information technology, facilities, the infrastructure (e.g., processes, systems). The amount and/or type of impact to one or each of these categories determines whether the associated audience will be saturated by too much change.

This disclosure describes a process to generate and add events to an enterprise calendar designed to prevent entities (e.g., employees, customers, groups) or services (e.g., processes, systems, facilities) from reaching or exceeding saturation levels. Various embodiments may provide one or more of the following technological improvements: 1) improved processes for managing change in an organization, group, or subgroup, 2) the unprecedented capability to measure change against a common scale, 3) the ability to provide reports on the level and amount of change expected to be experienced by one or more groups, 4) improved processes for determining a saturation level of a group or subgroup, and 5) improved methods of visually representing predicted change impact.

In the following description, for the purposes of explanation, numerous specific details are set forth in order to provide a thorough understanding of embodiments of the present disclosure. However, it will be apparent to one skilled in the art that embodiments may be practiced without some of these specific details. Throughout the disclosure, the calendar items may generally be referred to as "activities."

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105N may be stored on one or more computing devices 110A-110M or may be stored remotely on a server (in the "cloud"). These computing devices 110A-110M can include mechanisms for receiving and sending traffic by connecting through network 115, enterprise calendar platform 120, and data stores 125 and 130.

Computing devices 110A-110M may be configured to communicate via the network 115 with enterprise calendar platform 120. In some embodiments, computing devices 110A-110M can retrieve or submit information to enterprise calendar platform 120 and run one or more applications with customized content retrieved by enterprise calendar platform 120 and data stores 125 and 130. For example, computing devices 110A-110M can execute a browser application or a customized client to enable interaction between the computing devices 110A-110M, enterprise calendar platform 120, and data stores 125 and 130.

Network 115 can be any combination of local area and/or wide area networks, using wired and/or wireless communication systems. Network 115 can be or could use any or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Enterprise calendar platform 120 can be running on one or more servers and can be used to receive calendar events and activities, determine change impact scores, predict saturation levels, create displays of the change impact scores and saturation levels, monitor employee behaviors, store calendars and/or policies in data stores 125 and 130, and/or perform other activities. In some embodiments, enterprise calendar platform 120 includes various data processing and analytic tools that allow for recommendations for different dates for the calendar events and activities based on resources. Enterprise calendar platform 120 can, in some embodiments, create reports. However, in other embodiments, system coupled to but separate from enterprise calendar platform 120 creates reports. In some embodiments, enterprise calendar platform 120 is a server.

Enterprise calendar platform 120 may be communicably coupled with data stores 125 and 130 and computing devices 110A-110M and may communicate, access, or receive data (e.g., calendar information, employee behavior information) from computing devices 110A-110M and data stores 125 and 130. Enterprise calendar platform 120 may be associated with a membership organization.

Enterprise calendar platform 120 may be customized or calibrated by individual companies or service providers based on user needs and/or business objectives. For example, companies may have different business rules, and/or different criteria for determining change impact scores and saturation levels.

Data stores 125 and 130 can be used to manage storage and access to user data such as calendar activities and events, change impact scores, saturation levels, resources, employee behavior information, customer behavior information, and other information. Data stores 125 and 130 may be a data repository of a set of integrated objects that are modeled using classes defined in database schemas. Data stores 125 and 130 may further include flat files that can store data. Enterprise calendar platform 120 and/or other servers may collect and/or access data from the data stores 125 and 130.

Figure 2:
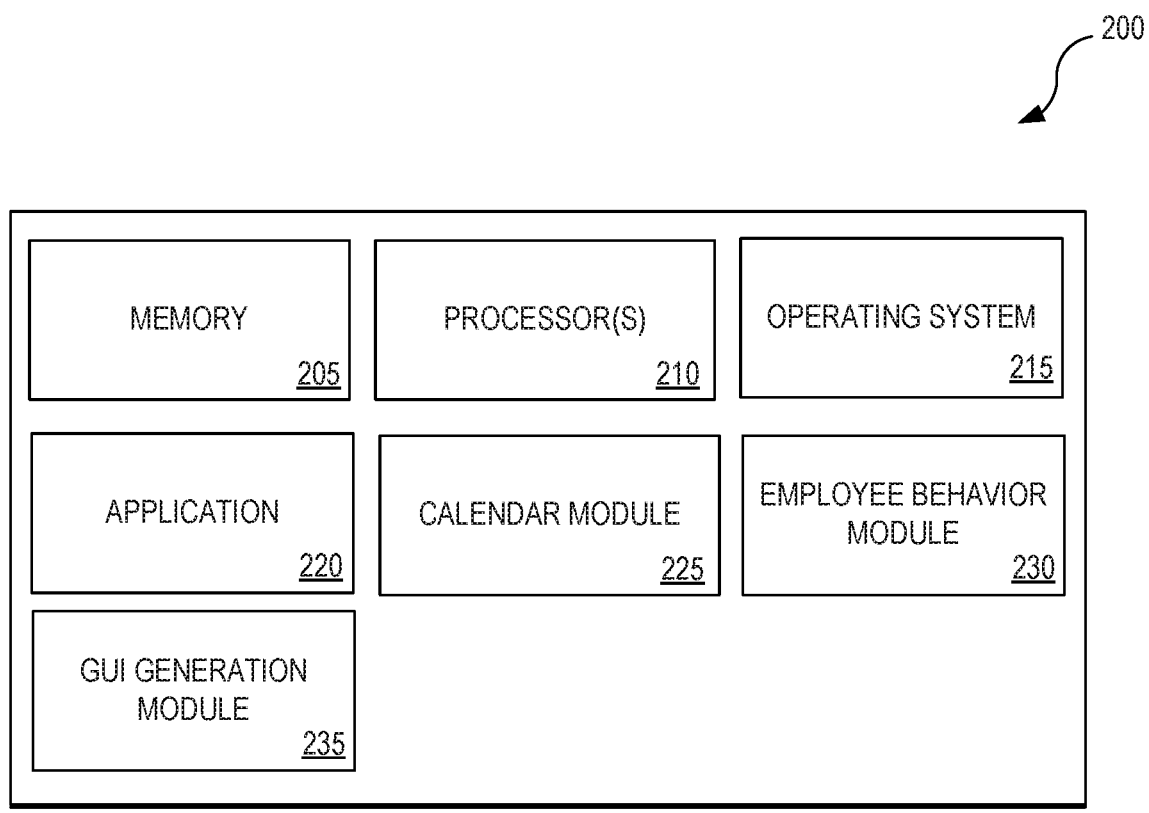
FIG. 2 illustrates various components of a computing device that may be used in accordance with one or more embodiments of the disclosure.

FIG. 2 illustrates a set of components 200 within computing device 110 according to one or more embodiments of the present disclosure. According to the embodiments shown in FIG. 2, computing device 110 can include memory 205, one or more processors 210, operating system 215, application 220, calendar module 225, employee behavior module 230, and graphical user interface (GUI) generation module 235. Other embodiments of the present disclosure may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, application 220 and calendar module 225 can be combined into a single component.

Memory 205 can be any device, mechanism, or populated data structure used for storing information. In accordance with some embodiments of the present disclosure, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Memory 205 may be used to store instructions for running one or more applications or modules on processor(s) 210. For example, memory 205 could be used in one or more embodiments to house all or some of the instructions needed to execute the functionality of operating system 215, application 220, calendar module 225, employee behavior module 230, and GUI generation module 235.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with enterprise calendar platform 120. For example, application 220 can include an application for financial services, a money transfer application, a social networking application, and a gaming application. Application 220 can access a server and/or a platform associated with an organization (e.g., enterprise calendar platform 120) to store a calendar associated with a user, division, group, organization, or to input new calendar items.

Calendar module 225 can communicate to enterprise calendar platform 120 requests to input calendar items into an enterprise calendar. Calendar items may include visiting dignitaries, events, change impact activities, or operation activities. The requests may be input into device 110 or may be collected from a calendar stored in application 220. Different types of calendar items may be requested for the calendar, including a visit from a visiting dignitary (e.g., vice president or above from any company, an Admiral, a General, a commanding officer, a political figure, a celebrity), events (e.g., company-sponsored activities, activities in which invitations may be mailed, activities open to employees on campus, activities involving external speakers), operational activities (e.g., rate changes, IT system changes, product releases, marketing campaigns/activities), and change impact activities (e.g., activities that will affect customer/members, building resources, the workload of one or more employees, groups, members/customers). Depending on the type of calendar item, more or less information may be requested. Information requested may include start and completion dates, resources affected, and an audience permitted to see the calendar item. In some embodiments, calendar module 225 can search the calendar for any event, type of event, submitter, date, time, attendee, or other field.

Employee behavior module 230 can exchange communication with enterprise calendar platform 120 regarding employee behavior. Such information can be used to develop a saturation level, which is the level (e.g., change impact score of one or more activities) at which certain behaviors start occurring. To develop the saturation level, information may be collected and analyzed. For example, employee information (e.g., location, time in and out of work, internet searching during work) can be collected by employee behavior module 230, transmitted to enterprise calendar platform 120, and corresponded to the number of change impact activities to determine a level at which employees may be saturated. In some embodiments, the change impact score for each activity going on during the time that the employees begin exhibiting the identified behaviors may be combined to determine a saturation level.

The saturation level may be used when scheduling activities. For example, if behavioral information or workplace metrics indicates that employees' saturation level will be exceeded if an activity (e.g., project, task, event, assignment) is scheduled during a certain time period, a recommendation may be made to reschedule the activity to prevent employees from becoming disgruntled or frustrated and leaving the company.

GUI generation module 235 can generate one or more GUI screens that allow for interaction with a user. In at least one embodiment, GUI generation module 235 generates a GUI to receive and/or convey information to the user. For example, the GUI generation module 235 may display a calendar input form.

Figure 3:
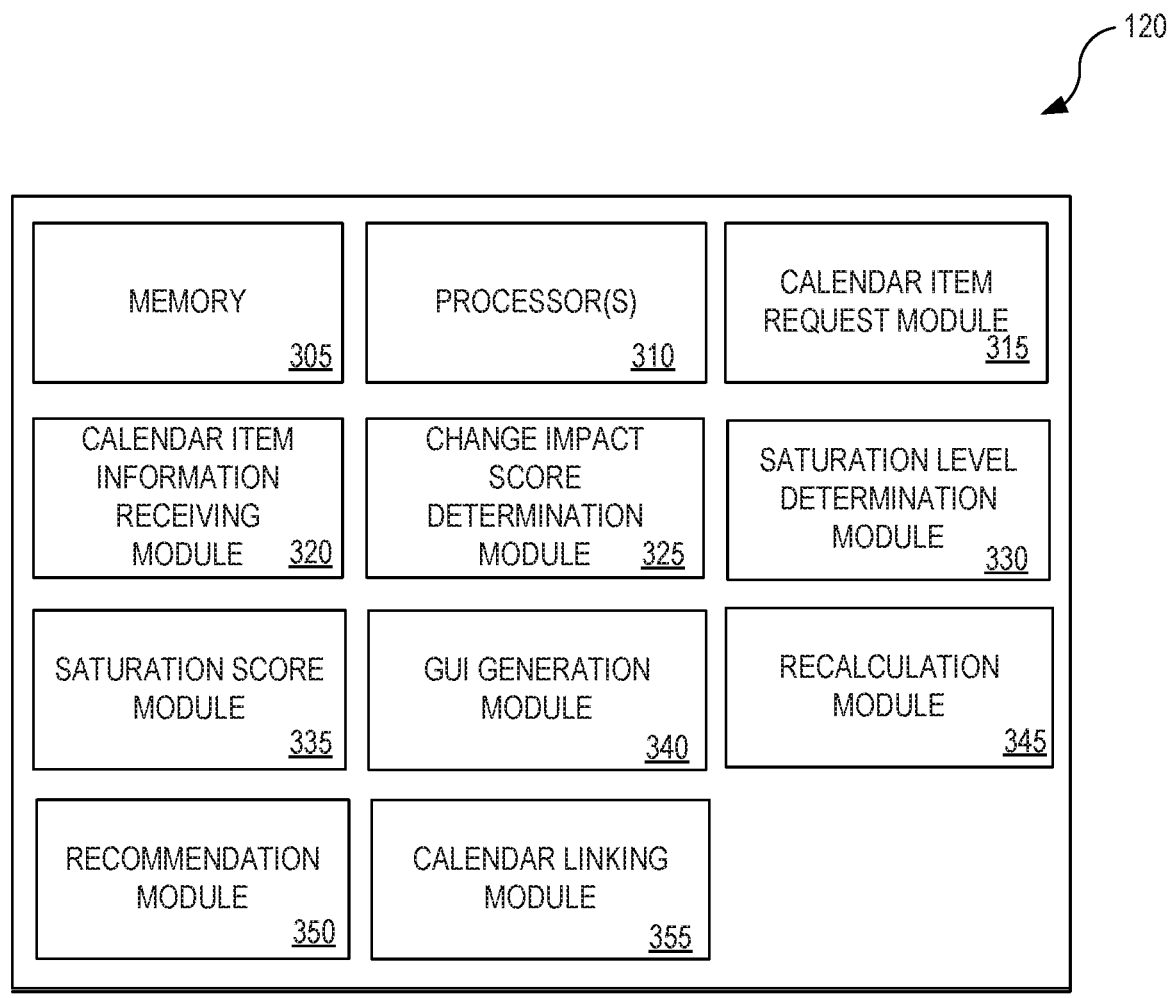
FIG. 3 illustrates various components of an enterprise calendar platform that may be used in accordance with various embodiments of the present disclosure.

FIG. 3 illustrates a set of components within enterprise calendar platform 120 according to one or more embodiments of the present disclosure. According to the embodiments shown in FIG. 3, enterprise calendar platform 120 can include memory 305, one or more processors 310, calendar item request module 315, calendar item information receiving module 320, change impact score determination module 325, saturation level determination module 330, saturation score module 335, GUI generation module 340, recalculation module 345, recommendation module 350, and calendar linking module 355. Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information, similar to memory 205 discussed above. Memory 305 may be used to store instructions for running one or more applications or modules on processor(s) 310. For example, memory 305 could be used in one or more embodiments to house all or some of the instructions needed to execute the functionality calendar item request module 315, calendar item information receiving module 320, change impact score determination module 325, saturation level determination module 330, saturation score module 335, GUI generation module 340, recalculation module 345, recommendation module 350, and calendar linking module 355.

Calendar item request module 315 receives requests to add calendar items to an enterprise calendar. In some embodiments, calendar items can include visiting dignitaries, events, operational activities, or change impact activities. The type of calendar item can be selected by the user or detected based on limited information provided by the user.

Calendar item information receiving module 320 collects information regarding the calendar item. Depending on which type of calendar event is selected (or detected), different information can be requested. For example, if a visiting dignitary is selected, information such as the name of the dignitary, reason for the visit, date, time, who the dignitary is meeting with, type of security needed, and who has permission to view the event can be requested. When an event is selected (or detected), information such as the group requesting the event, the purpose of the event, and funds needed for the event can be requested. When an operational activity is selected (or detected), information such as systems and groups affected by the operational activity, a start date, and completion date can be requested.

When a change impact activity is selected (or detected), calendar item information receiving module 320 may ask the user whether the activity is documented in one or more programs and whether certain information can be imported from such programs. The user may be asked to provide additional information such as the group, subgroup, and/or department where the project originated, the status and/or phase of the project, a sponsor of the project, milestones of the project, a description of the goal or problem statement of the project, a description of the project, and the primary affected resources (e.g., customers, employees, departments). Next, the user may be asked to provide dates for the activity. In some embodiments, the user can provide several dates such as an implementation date (i.e., date the changes for a particular phase or release take effect; e.g., when employees start working on the project, date a kick-off meeting is scheduled for), start date (i.e., date of the first impact), completion date (i.e., date of the end of the first impact; e.g., when implemented or when the employees or customers will receive or adopt changes). Additional dates for additional phases or releases can be input as well.

Next, calendar item information receiving module 320 is asked to more specifically identify the impacted parties (e.g., division, sub-level of a division, functional area, departments, employees, contractors, customers/members). In some embodiments, calendar item information receiving module 320 can estimate the number of people affected based on the impacted parties. The user may further be asked to provide a geographical region (e.g., city, building in a city, floor of a building) which can be impacted by the change. In some embodiments, the user can also include a cost estimate or other resources affected from the start date to the completion date of the project or phase of the project. If desired, the user can provide additional sets of dates for the project and groups or other resources affected for the additional sets of dates. In some embodiments, information for each group can be automatically retrieved.

Calendar item information receiving module 320 may also ask for additional information such as a degree of organizational change (e.g., up to X % of impacted audience will have a new role or supervisor), a degree of process change (e.g., minor tweaks to existing process, major changes to less than five processes, major changes to greater than five processes), and degree of technology or system change (e.g., none, visible change to system with indirect impact on target audience, new system with major impact on target audience and requires significant training). Calendar item information receiving module 320 can send the information about the potential calendar item to change impact score determination module 325.

Change impact score determination module 325 determines an impact of activity on resources from the start date to the completion date based on the information provided from calendar item information receiving module 320. The change impact score of the activity represents an estimated amount of impact the activity will have on one or more parts of an organization (e.g., group, subgroup, functional group, division, department, customers). In some embodiments, answers to certain questions asked by calendar item information receiving module 320 can each be scored to determine the change impact score for the resource. Change impact score determination module 325 may categorize the impact of the activity as high, medium, or low based on the change impact score.

Saturation level determination module 330 determines a saturation level for one or more parts of an organization (e.g., group, subgroup, functional group, division, department, customers). The saturation level is the level in which employees exhibit certain behaviors such as posting for other jobs, coming into work at irregular times, searching for other positions, and leaving the organization. Saturation levels may be determined based on previously monitored and recorded information from the organization or from other organizations. To determine a saturation level for an organization or part of an organization, the employees/contractors/other resources can be given a number of projects and constantly or periodically monitored until they exhibit signs of saturation. The monitoring can be done using various systems. For example, RFID clock in/clock out times can be monitored to detect irregular patterns. In other examples, employees' computers can be monitored to determine whether the employees are searching for other employment or sending communications that indicate the user is disengaged or unhappy with his or her position. Additionally, various systems can track and correlate when employees take unplanned time off, when workplace satisfaction numbers go down, or when employees leave their positions to determine a saturation level. Any number of behavioral metrics can be used to determine the saturation level of one or more groups.

When several parts of an organization are expected to be impacted by the activity, several saturation levels can be determined. In some embodiments, saturation levels may not only be determined for a subgroup being impacted, but they may also be determined for the group even if other subgroups in the group are not expected to be impacted.

Saturation score module 335 determines one or more saturation scores for one or more parts of the organization from the start date to the completion date. A saturation score is an indication of how pressured the resources are during the time period. The saturation score for a resource is computed based on the change impact score of the activity as well as the change impact scores of other activities and events (e.g., holidays, planned vacations, times when call volume is expected to be high) occurring during the period from the start date to the completion date that will impact that resource. For example, the period of time in question may extend over a period of time in which many people take vacations (e.g., end of December, Fourth of July, Labor day). Such information may be taken into consideration in calculating the saturation scores. In an example, a subgroup may have one or more very high saturation scores if the group is expected to be impacted by several different medium to high impact activities during the same period of time. In another example, a group may similarly have one or more high saturation scores if the group is expected to be impacted by three or four low impact events during a period of time when many people take vacations.

During a given time period, a resource may have one constant saturation score or several different saturation scores. For example, the saturation score may be constant during several days of an activity but may spike when a second activity is supposed to start. Saturation score module 335 can compare the saturation score with the saturation level for one or more parts of the organization.

Figure 7:
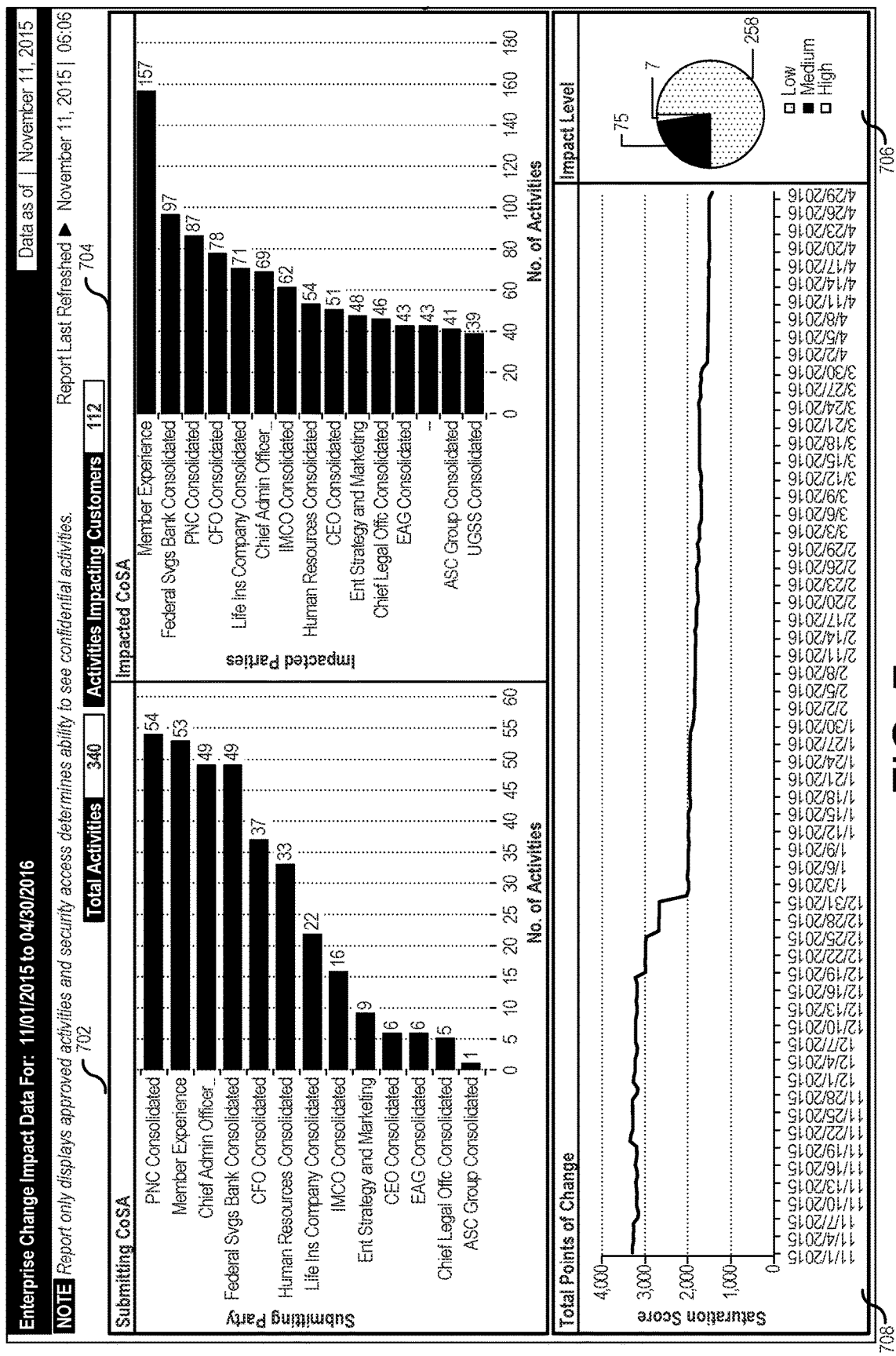
FIG. 7 is an example of a graphical user interface in accordance with various embodiments of the disclosure.

Information regarding the saturation level, change impact, and saturation scores can be displayed by GUI generation module 340. GUI generation module 340 can generate one or more GUI screens that allow for interaction with a user. One example of how GUI generation module 340 can display the information is shown in FIG. 7. In FIG. 7, change impact information for an entire company during a period of time is summarized in a variety of charts and graphs. The groups who submitted activities expected to impact one or more groups (e.g., Submitting Parties) can be shown in the top left (element 702). The chart may illustrate how many activities have been submitted by each group. The resources expected to be impacted (e.g., Impacted Parties) may be shown on the top right, and that chart includes the number of activities expected to impact each group (element 704).

GUI generation module 340 may further show a summary of the number of events and their impact level (e.g., high, medium, low) (element 706). Saturation scores (i.e., some combination of the activity scores) for the enterprise may be plotted over time (element 708). In some embodiments, a saturation level for the organization can be plotted with the corresponding saturation scores.

Recalculation module 345 may recalculate or regenerate one or more saturation scores using different dates if any portion, or a portion sustained for a period of time, is at or above the saturation level for the part of the organization in question. For example, the saturation level in FIG. 7 may be at 3,000. Assuming this is true, because the saturation score is above 3,000 from Nov. 11, 2015 and does not drop below 3,000 until Dec. 25, 2015, recalculation module 345 can recalculate dates for one or more activities that occur during the time of high saturation with the goal of reducing the saturation score below the saturation level. Different dates may then be recommended for the requested activity or for other activities.

Recommendation module 350 can recommend different dates for one or more activities based on the saturation levels. In some embodiments, GUI generation module 340 can display the plot of the updated saturation scores based on the updated dates. In some embodiments, the updated saturation scores can be displayed on the same plot as the previous saturation scores, which can change the timeline to include a greater amount of time and relocate the original saturation scores to track with the original start and completion dates while adding in the saturation scores for the alternative start and completion dates.

Calendar linking module 355 can link one or more activities to the enterprise calendar and add the activity to the enterprise calendar. In some embodiments, adding the event to the enterprise calendar occurs automatically if the saturation score(s) are below saturation level. In some embodiments, calendar linking module 355 links or adds the activity to the calendar if the activity is determined to be a change impact event (e.g., change score is above a threshold) and can be moved if necessary later when saturation scores are calculated.

Figure 4:
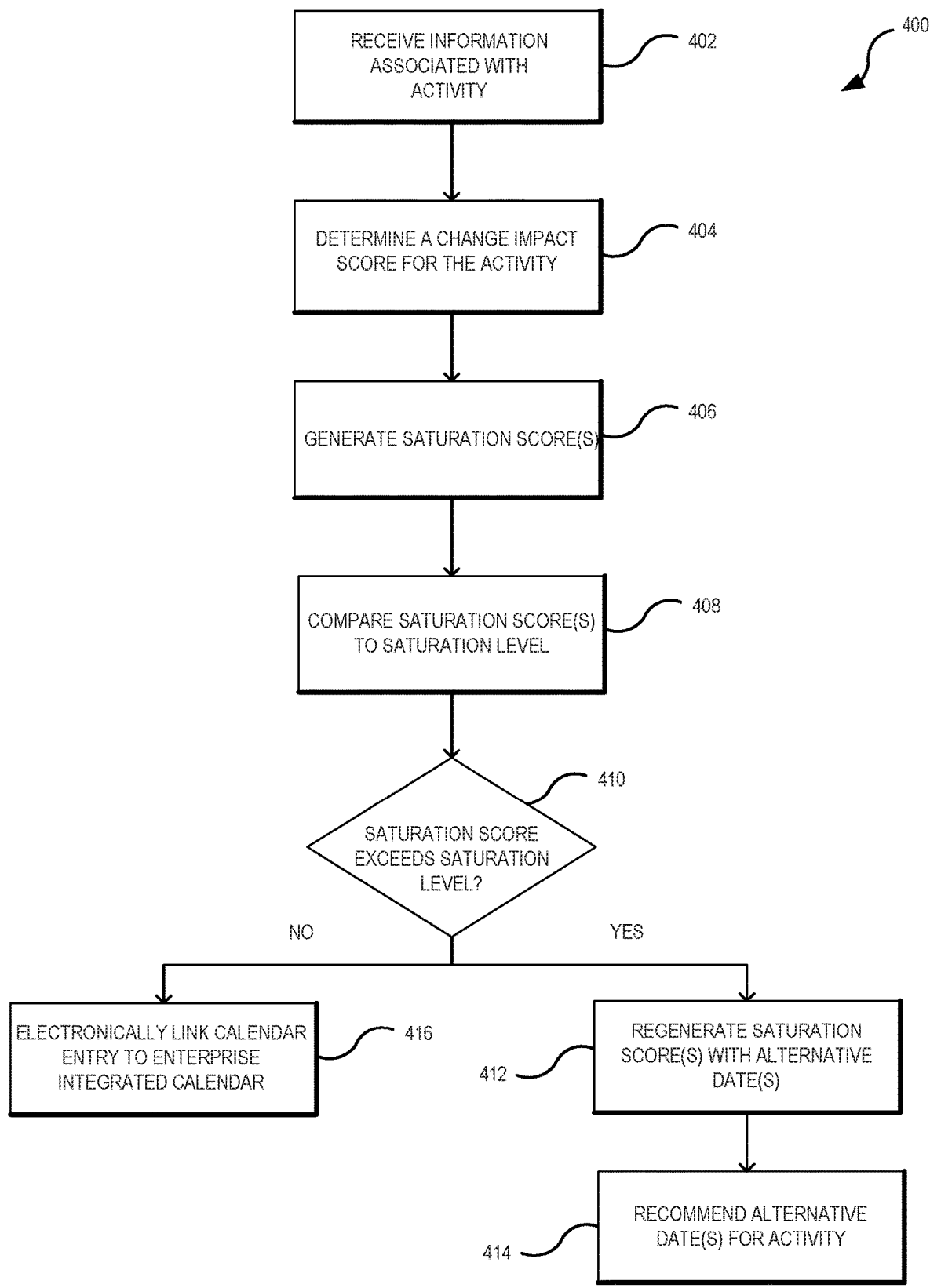
FIG. 4 is a flowchart illustrating a set of operations for adding an activity to an enterprise integrated calendar in accordance with various embodiments of the disclosure.
Figure 5:
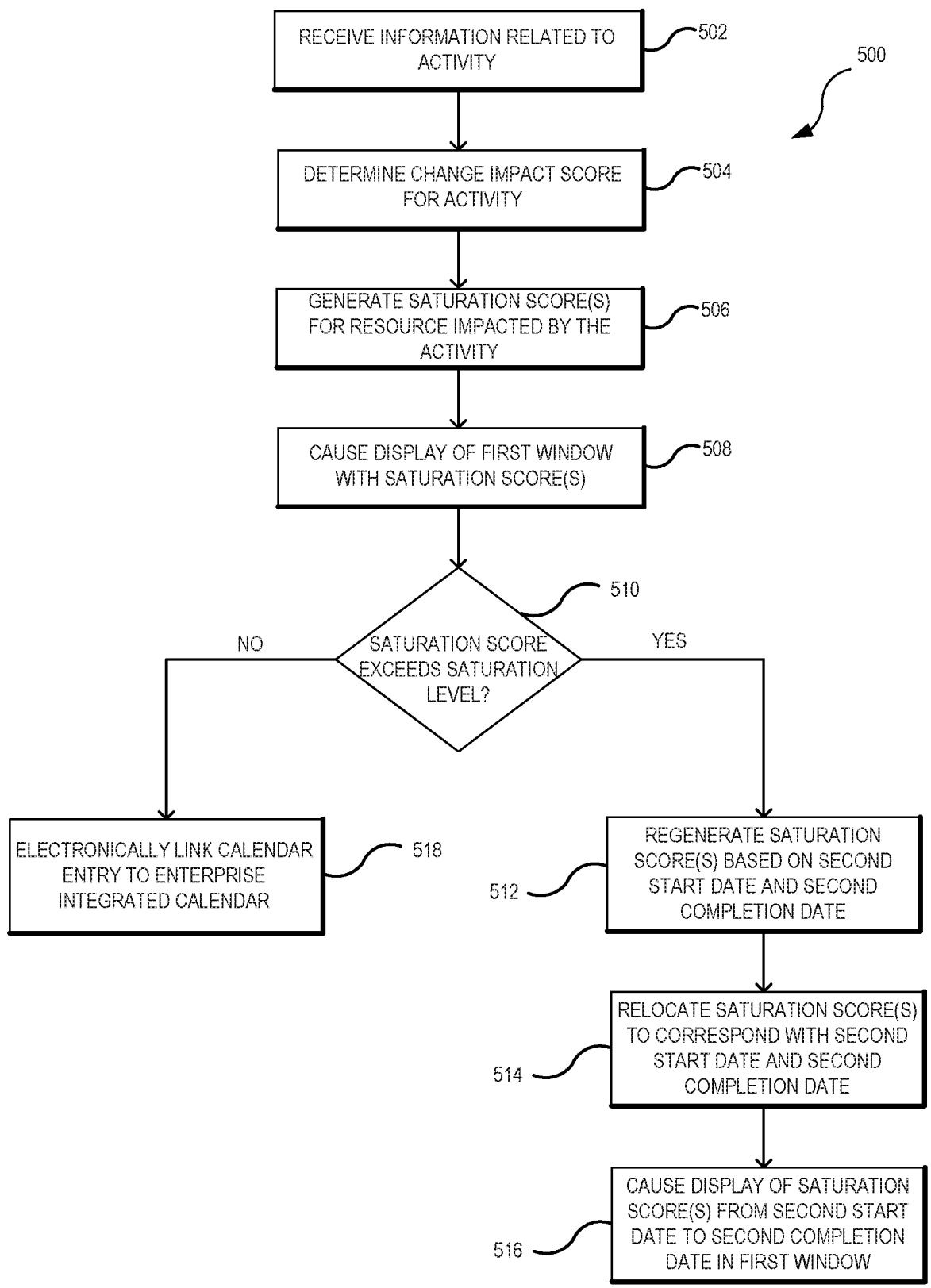
FIG. 5 is a flowchart illustrating a set of operations for dynamically relocating information within a window displayed in a graphical user interface in accordance with various embodiments of the disclosure.
Figure 6:
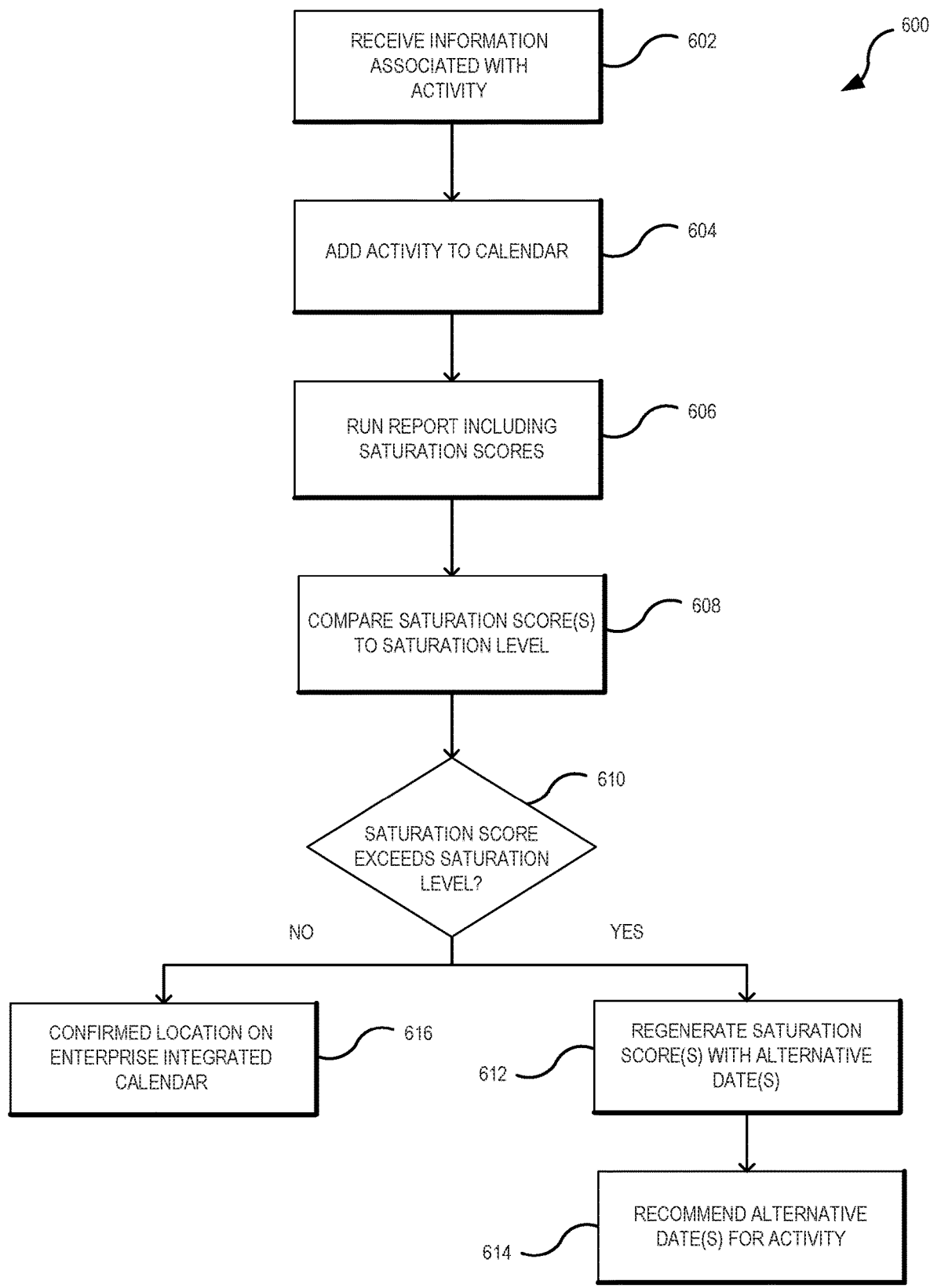
FIG. 6 is a flowchart illustrating a set of operations in accordance with various embodiments of the disclosure.

FIGS. 4-6 are flowcharts illustrating sets of operations. In some embodiments, fewer than all of the operations in each set of operations are performed, whereas in other embodiments additional operations are performed. Moreover, in some embodiments, the operations may be performed in different orders or in parallel. The operations can be performed by various components of device 110 illustrated in FIG. 2 and/or various components of enterprise calendar platform 120 illustrated in FIG. 3.

FIG. 4 is a flowchart illustrating a set of operations 400 for adding an activity to an enterprise integrated calendar.

Receiving operation 402 receives information associated with an activity, including a start date, completion date, and resources that are expected to be impacted by the activity. The information can be input by a user or gathered from a calendar associated with a group or a user. The resource can be a group of employees, subgroup of employees, department, contractor, fund, or building space. Additional information regarding the level of impact may be received from the user or a linked calendar to determine a level of change.

Determining operation 404 determines a change impact score for the activity based on the user's answers regarding the level of change the activity is expected to bring. In some embodiments, each answer is given a score and the scores are averaged, combined, or otherwise manipulated to determine a change impact score for the activity. Generating operation 406 generates a saturation score, or a series of saturation scores, representing the impact that all the activities, events, holidays, and/or vacations, including the requested activity, have on a resource or multiple resources from at least the start date to the completion date. There may be multiple saturation scores from the start date to the completion date because certain activities may not be sustained through the entire time period, thus resulting in fewer activities saturating the group at that time.

Comparing operation 408 compares the saturation score(s) to a saturation level. The saturation level can be the level at which the resources exhibit identified behaviors such as leaving an organization, transferring to a different department within an organization, taking unplanned vacations, and exhibiting irregular patterns such as coming in late. Decision operation 410 determines whether one or more saturation scores exceed the saturation level. In some embodiments, the saturation scores have to exceed the saturation level for greater than a certain period of time to trigger a "yes" determination, while in other embodiments, a single score exceeding the saturation level is enough trigger the "yes" determination.

When one or more saturation scores exceed the saturation level, decision operation 410 branches to regeneration operation 412 where the saturation scores are regenerated using alternative dates. In this way, the activity can be scheduled during times when the employees/groups are not as busy or expected to be at their saturation level. When alternative dates are found that result in saturation scores that do not exceed the saturation level over the period of time, recommending operation 414 can recommend the alternative dates to the user for the activity.

When the saturation score(s) do not exceed the saturation level, decision operation 410 branches to linking operation 416 where the calendar entry with the activity is electronically linked to the enterprise integrated calendar. In some embodiments, the activity is already linked or otherwise added to the enterprise integrated calendar and linking operation 416 maintains the link and does not move the activity.

FIG. 5 is a flowchart illustrating a set of operations 500 for dynamically relocating information within a window displayed in a GUI. Operations 502-506 are similar to operations 402-406. Displaying operation 508 causes a display of a first window with the saturation score from the start time to the completion time to provide a visual representation of how saturated a resource will be during the time period of the activity. In some embodiments, the saturation scores for more than one resource group are shown in various windows. In some embodiments, a saturation level for the resource group can be displayed with the saturation score, providing a visual indicator of whether the resource is predicted to be saturated if the activity is to be added to the enterprise calendar during the start date and the completion date.

Decision operation 510 determines whether one or more saturation scores exceed the saturation level. When one or more saturation scores exceed the saturation level, decision operation 510 branches to regenerating operation 512 where the saturation score is regenerated based on a second start date and a second completion date. Relocating operation 514 relocates the saturation scores in the first window to correspond with the second start date and the second completion date. Displaying operation 516 causes a display of the saturation scores from the second start date to the second completion date in the first window. In some embodiments, instead of replacing the saturation scores, additional saturation scores with the additional start and completion dates are added to the timeline, extending the timeline and relocating the original saturation scores and adding the additional saturation scores.

When the saturation scores do not exceed the saturation level, decision operation 510 branches to linking operation 518 where a calendar entry in a calendar associated with a user or a group is electronically linked to the enterprise integrated calendar. In some embodiments, the activity is already linked or otherwise added to the enterprise integrated calendar and linking operation 518 maintains the link and does not move the activity.

FIG. 6 is a flowchart illustrating a set of operations 600 for adding a change impact activity to an enterprise integrated calendar. Receiving operation 602 receives information associated with an activity, including a start date, completion date, and resources that are expected to be impacted by the activity. The information can be input by a user or gathered from a calendar associated with a group or a user. The resource can be a group of employees, subgroup of employees, department, contractor, fund, or building space. Additional information regarding the level of impact may be received from the user or a linked calendar to determine a level of change.

Adding operation 604 adds the activity to the calendar. In some embodiments, the activity is added only if it is expected to cause a certain amount of change or impact. In some embodiments, certain groups need to approve the addition of the activity to the calendar and provide an indication of who is cleared to see the activity. Adding may include electronically linking a calendar entry associated with the activity to the enterprise integrated calendar. Running operation 606 runs one or more reports of one or more of the change impact activities, including the saturation scores for the organization and/or group.

Comparing operation 608 compares the saturation score(s) to a saturation level. The saturation level can be the level at which the resources exhibit identified behaviors such as leaving an organization, transferring to a different department within an organization, taking unplanned vacations, and exhibiting irregular patterns such as coming in late. Decision operation 610 determines whether one or more saturation scores exceed the saturation level. In some embodiments, the saturation scores have to exceed the saturation level for greater than a certain period of time to trigger a "yes" determination, while in other embodiments, a single score exceeding the saturation level is enough trigger the "yes" determination.

When one or more saturation scores exceed the saturation level, decision operation 610 branches to regeneration operation 612 where the saturation scores are regenerated using alternative dates. In this way, the activity can be scheduled during times when the employees/groups are not as busy or expected to be at their saturation level. When alternative dates are found that result in saturation scores that do not exceed the saturation level over the period of time, recommending operation 614 can recommend the alternative dates to the user for the activity. In some embodiments, dates of other activities may be moved (e.g., based on priority) instead of the dates for the activity.

When the saturation score(s) do not exceed the saturation level, decision operation 610 branches confirming operation 616 where the activity is confirmed to be to linking operation 616 where the activity is confirmed in its location on the enterprise integrated calendar.

Figure 8:
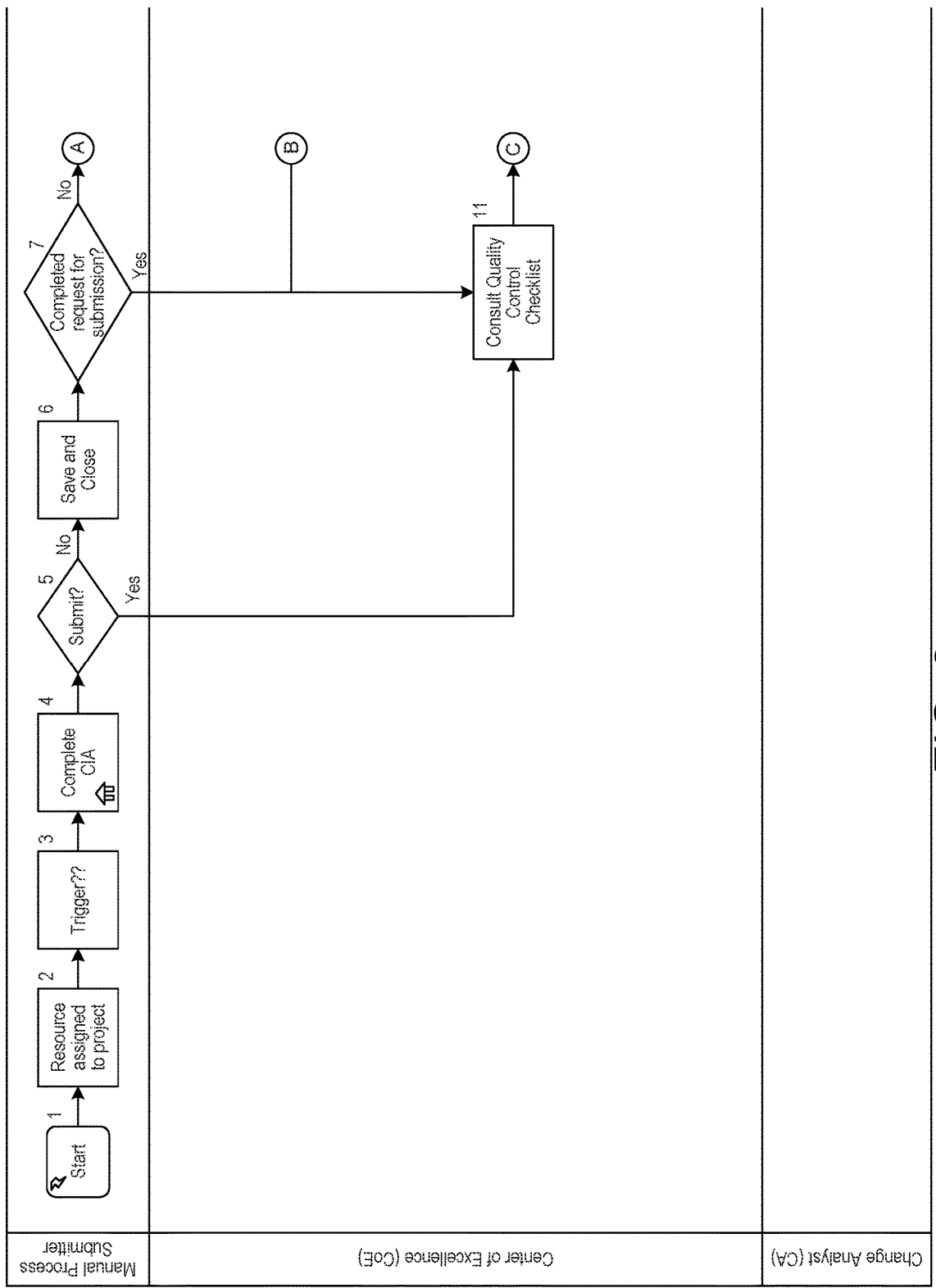
FIGS. 8-10 are a flowchart illustrating a set of operations for submitting a change impact event for placement on an enterprise calendar.
Figure 9:
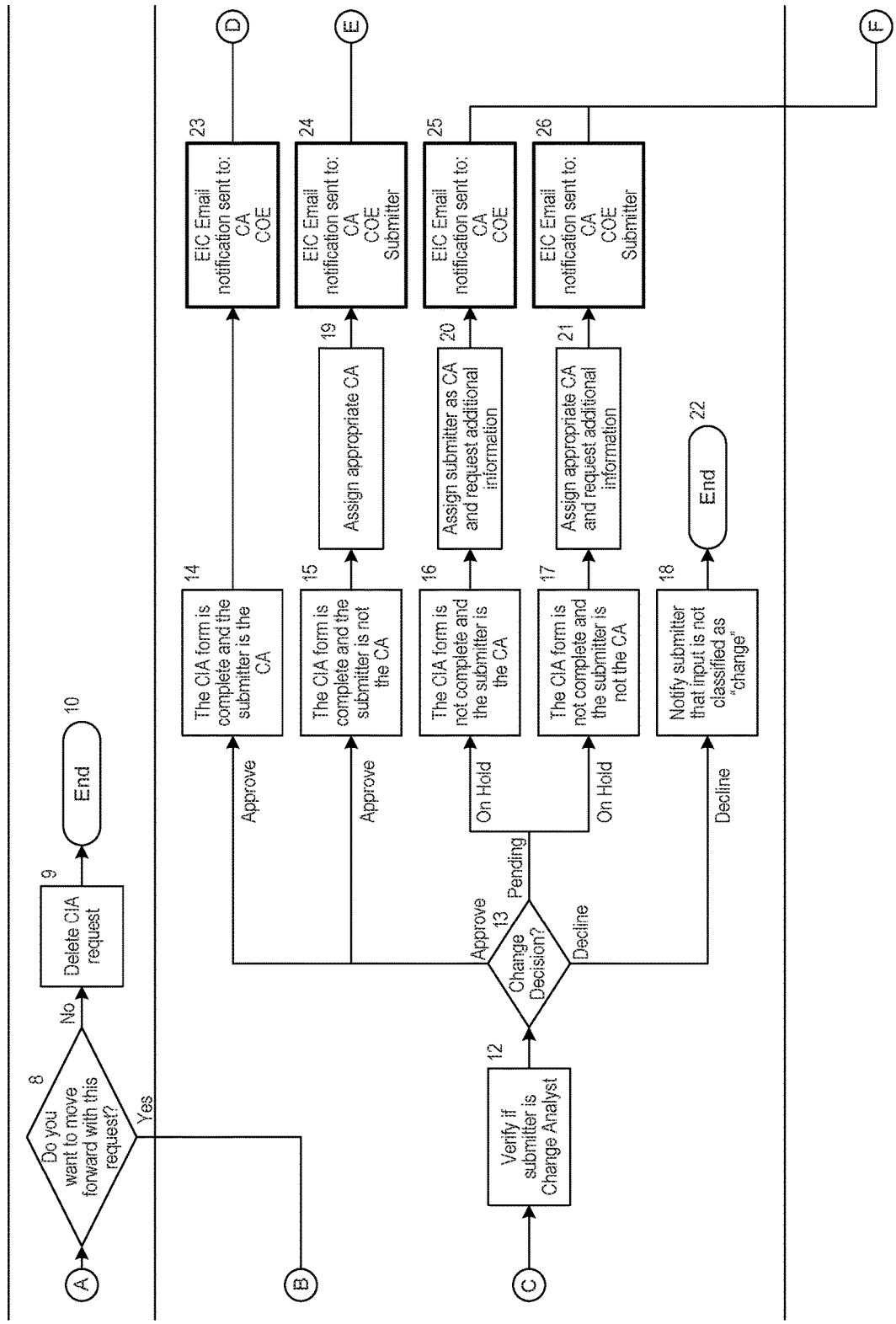
Figure 10:
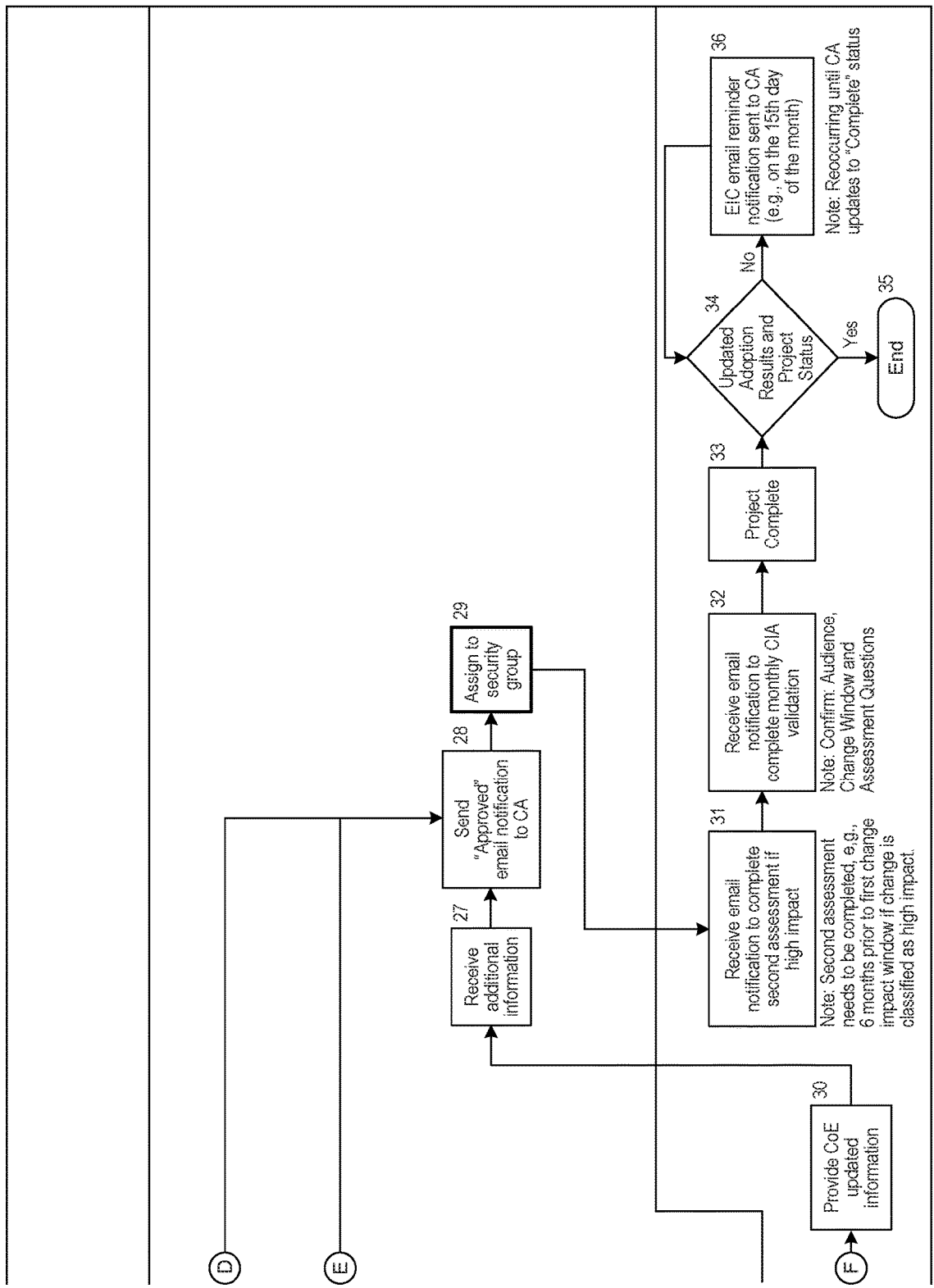

FIGS. 8-10 are a flowchart illustrating a set of operations for submitting a change impact event for placement on an enterprise calendar. Fewer or more operations can be performed. The process starts (operation 1) when the user indicates some information such as the resources assigned to the activity (operation 2). When the number of resources or other information triggers a change impact assessment (operation 3), the user is asked to complete a change impact assessment form requesting approval to add a change impact event to the enterprise calendar (operation 4). The user then decides whether the user would like to submit the request (decision operation 5). If the user is not ready to submit the request, the user saves and closes the form (operation 6). When the user reopens the form, the system determines whether the request is completed for submission (decision operation 7). When the request is not completed, the user is asked whether the user wants to move forward with the request (decision operation 8). When the user does not want to move forward with the request, the change impact assessment request is deleted (operation 9) and the process is ended (operation 10).

When the user wants to move forward with the request or the request is otherwise ready for submission, the request is submitted to the Center of Excellence (operation 11) to determine whether the change event should be included on the enterprise calendar. The Center of Excellence first determines whether the submitter is change analyst (i.e., a person who analyzes change for the organization) (operation 12). A change decision (i.e., decision whether to add the event/activity to the enterprise calendar) is made based on whether the change impact assessment request form is complete, whether the submitter is a change analyst, and whether the requested change meets the criteria to be considered a change impact event (operation 13).

When the change decision gives the activity a status of "declined," the submitter is notified that the activity is not classified as a change (operation 18) and the process is ended (operation 22).

When the change decision is given a status of approved for inclusion on the enterprise integrated calendar, the change impact assessment form is complete, and the submitter is a change analyst (operation 14), an enterprise integrated calendar ("EIC") email notification is sent to the change analyst and the center of excellence (operation 23). When the change decision is given a status of approved for inclusion on the enterprise integrated calendar, the change impact assessment form is complete, and the submitter is not the change analyst (operation 15), the change event is assigned to a change analyst (operation 19) and an EIC email notification is send to the change analyst, the center of excellence, and the submitter (operation 24). When the status of the change decision for the activity is "approved," an "approved" email notification is sent to the change analyst (operation 28). The change request is assigned to a security group (e.g., a group of people who are authorized to know about the change impact event) (operation 29).

When the change decision gives the activity status of "on hold," the change impact assessment form is incomplete, and the submitter is a change analyst (operation 16), the submitter is assigned as a change analyst and more information is requested (operation 20). An EIC email is sent to the change analyst and the center of excellence (operation 25). When the change decision gives the activity a status of "on hold," the change impact analysis form is incomplete, and the submitter is not a change analyst, (operation 17), a change analyst is assigned and additional information is requested (operation 21). An EIC email is sent to the change analyst, the center of excellence, and the submitter (operation 26). When the status of the change decision is on hold, the change analyst provides the Center of Excellence with updated information when it is available (operation 30). Once the Center of Excellence receives the additional information (operation 27), an "approved" email notification is sent to the change analyst (operation 28). The change request is assigned to a security group (e.g., a group of people who are authorized to know about the change impact event) (operation 29).

After the approved change requests are assigned to a security group (operation 29), the change analyzer receives an email notification to complete a second assessment at some time prior to a first change impact window (e.g., 6 months) if the request is considered a high impact (operation 31). The change analyst may also receive an email to complete a monthly change impact assessment validation to confirm aspects of the change event (e.g., audience, resources) (operation 32). When the project (i.e., submitting the change event) is complete (operation 33), the change event is monitored and the status and adoption results are updated (operation 34), with reminders being sent to the change analyst on a regular basis (operation 36) until the change event is complete and the process is ended (operation 35).

Figure 11:
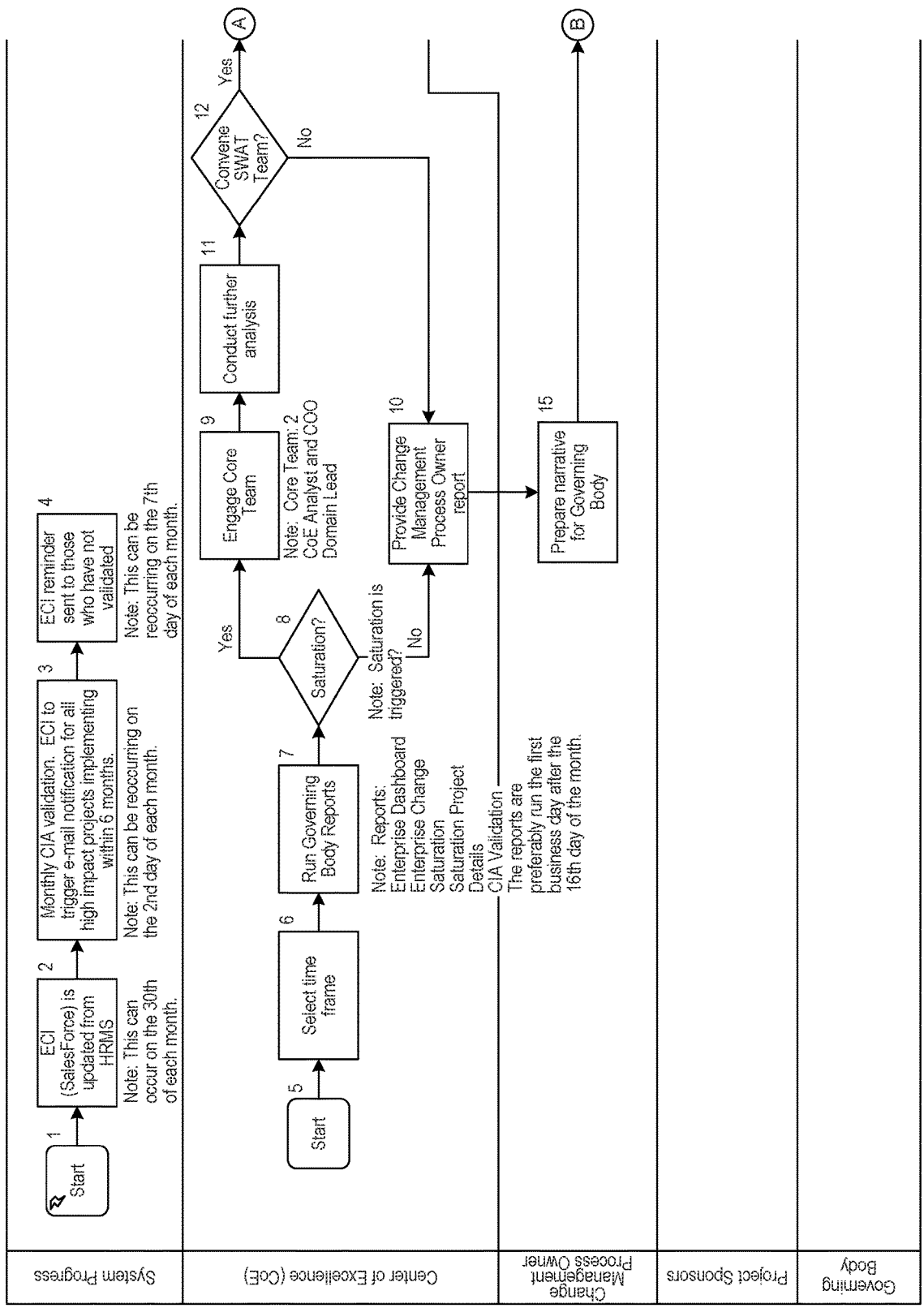
FIGS. 11-12 are a flowchart illustrating a set of operations for creating a report and recommending changes to change impact activities.
Figure 12:
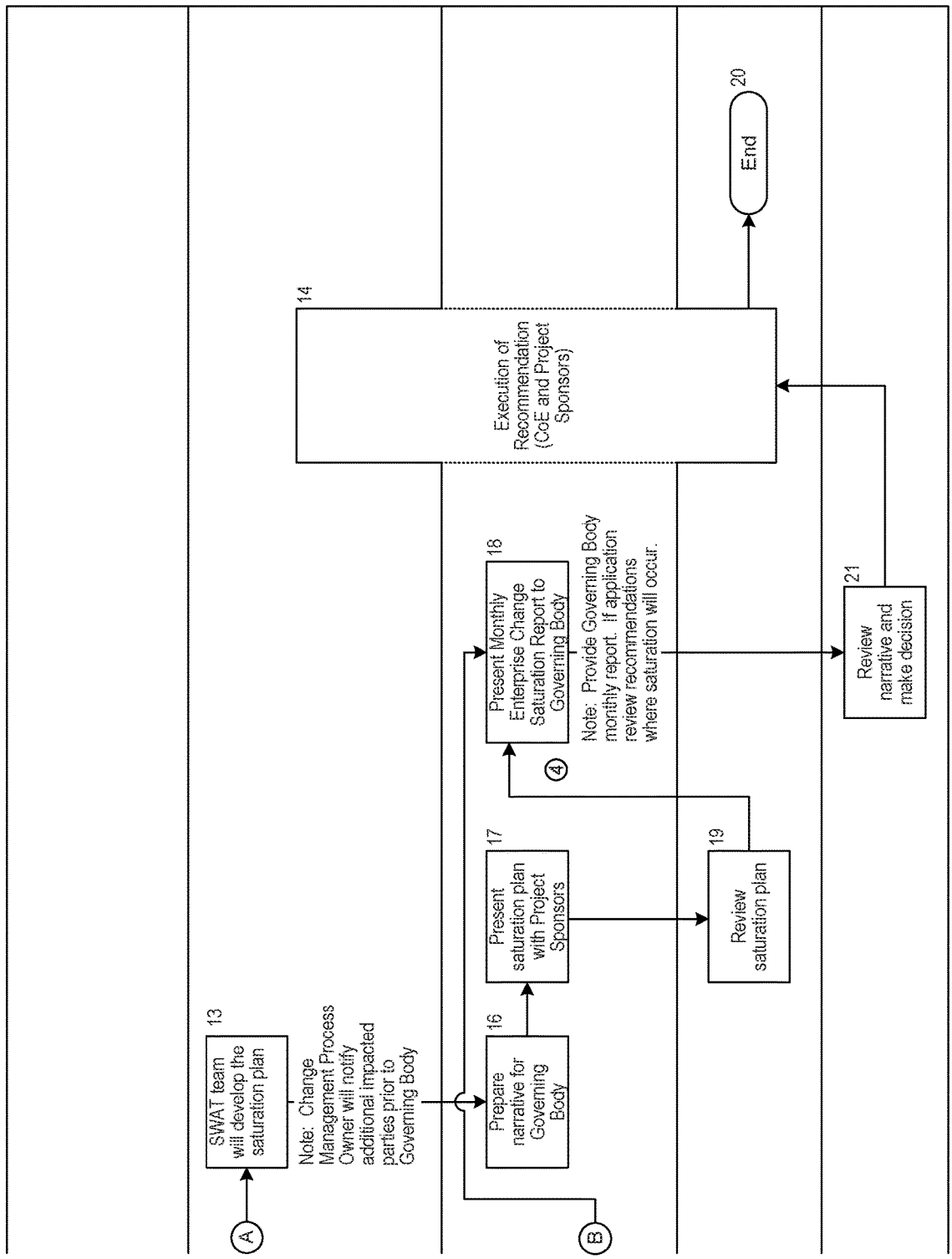

FIGS. 11-12 are a flowchart illustrating a set of operations for running reports and recommending changes to change impact activities. Fewer or more operations can be performed. The system process begins (operation 1) when the enterprise calendar is updated (operation 2). Periodic change impact assessment validation is completed via email notifications triggered for all high impact projects planning to be implemented within a certain time period (e.g., 6 months) (operation 3). Reminders can be sent to those who have not validated (operation 4).

The center of excellence process begins (operation 5) by selecting a time frame (operation 6), and running report (e.g., enterprise dashboard reports, enterprise saturation reports, saturation project details, change impact assessment validation) (operation 7). It is determined whether one or more portions of the organization will be saturated during the selected time period (operation 8). When the report shows that the enterprise or a group in the enterprise will be saturated during the time period, a change management process owner report is provided (operation 10). The change management process owners can prepare a narrative for the governing body (operation 15) and present a monthly enterprise change saturation report (operation 18).

When the reports show that the enterprise, or a portion of the enterprise will be saturated during the time period, a core team is engaged (operation 9), which may include an analyst, leader in the group that is saturated, or others. Further analysis may be conducted (operation 11) and it may be decided whether a further analysis team needs to be convened (decision operation 12). When a team does not need to be engaged, the change management process owners report is provided (operation 10). When the team is to be convened (e.g., saturation level is very high), the team develops a saturation plan (operation 13), which may mean shifting certain change impact events to different time periods. The change management process owners prepares a narrative for the governing body (operation 16) and presents a saturation plan with the project sponsors (operation 17). The project sponsors can review the plan (operation 19). The change management process owners present a monthly enterprise change saturation report (operation 18).

After the change management process owners present a monthly enterprise change saturation report (operation 18), the governing body reviews the narrative and makes a decision (operation 21). Next, the change management process owner executes the recommended changes (operation 14) and the process ends (operation 20).

Computer System Overview

Figure 13:
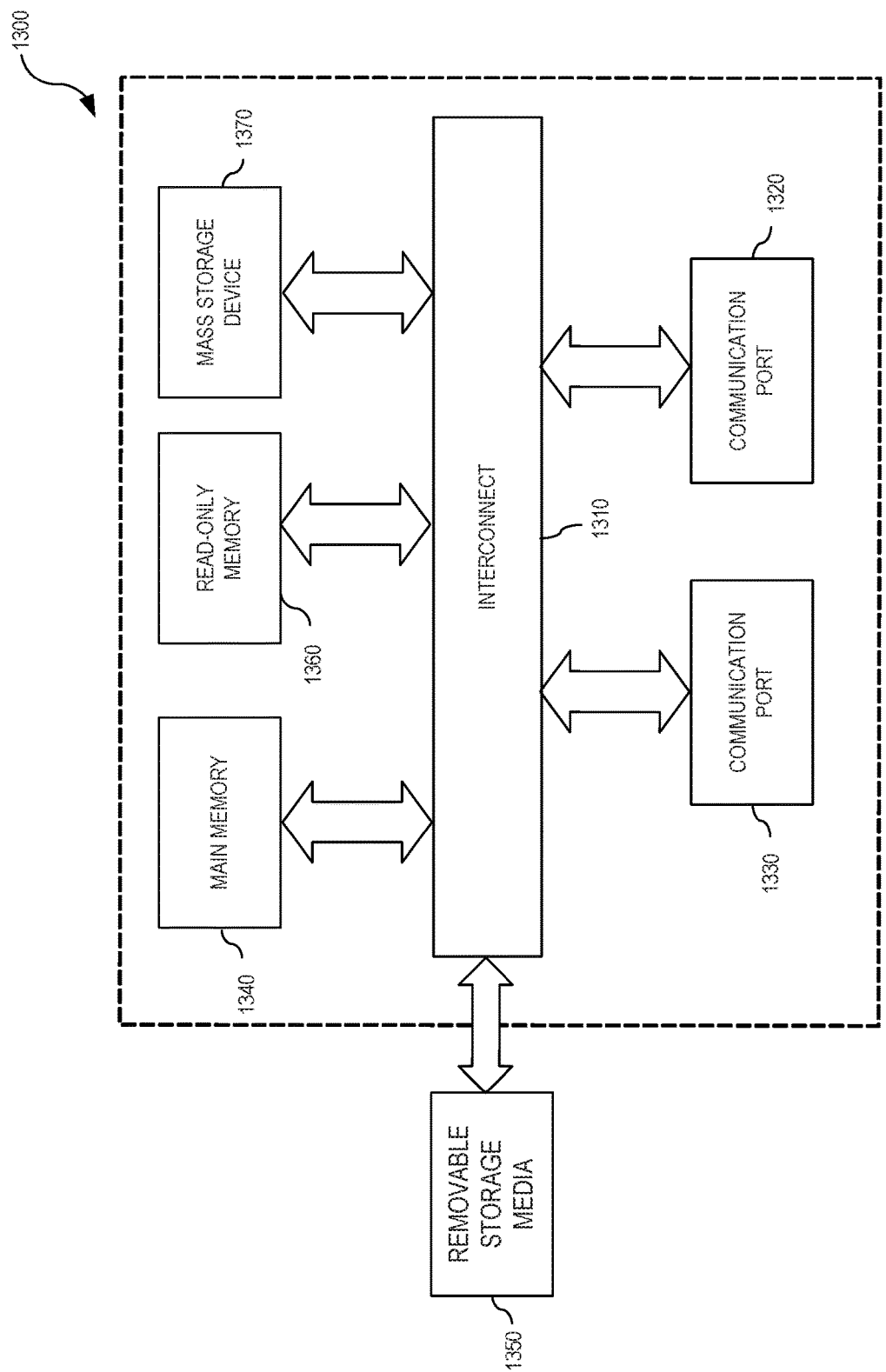
FIG. 13 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 13 is an example of a computer system 1300 with which embodiments of the present disclosure may be utilized. According to the present example, the computer system includes an interconnect 1310, at least one processor 1320, at least one communication port 1330, a main memory 1340, a removable storage media 1350, a read-only memory 1360, and a mass storage 1370.

Processor(s) 1320 can be any known processor, such as, but not limited to, an Intel® Itanium® or Itanium 2® processor(s), or AMD® Opteron® or Athlon MP® processor(s), or Motorola® lines of processors. Communication port(s) 1330 can be any of an RS-232 port for use with a modem-based dialup connection, a 10/100 Ethernet port, or a Gigabit port using copper or fiber. Communication port(s) 1330 may be chosen depending on a network such a Local Area Network (LAN), Wide Area Network (WAN), or any network to which the computer system 1300 connects.

Main memory 1340 can be Random Access Memory (RAM) or any other dynamic storage device(s) commonly known in the art. Read-only memory 1360 can be any static storage device(s) such as Programmable Read-Only Memory (PROM) chips for storing static information, such as instructions for processor 1320.

Mass storage 1370 can be used to store information and instructions. For example, hard disks such as the Adaptec® family of SCSI drives, an optical disc, an array of disks such as RAID, the Adaptec family of RAID drives, or any other mass storage devices may be used.

Interconnect 1310 communicatively couples processor(s) 1320 with the other memory, storage, and communication blocks. Interconnect 1310 can be a PCI/PCI-X- or SCSI-based system bus, depending on the storage devices used.

Removable storage media 1350 can be any kind of external hard-drives, floppy drives, IOMEGA® Zip Drives, Compact Disc Read-Only Memory (CD-ROM), Compact Disc Re-Writable (CD-RW), Digital Video Disc Read-Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for assessing an impact of an activity and adding an activity to an enterprise integrated calendar. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

We claim:

1. A computer-implemented method for dynamically relocating information within a window displayed in a graphical user interface, the method comprising:
    receiving, from a linked calendar into a graphical user interface on a computer screen, information related to an activity on the calendar, the activity having a first start date, a first completion date, and an impact on a resource of an organization, wherein the information related to the activity includes a percentage of organizational change, a percentage of process change, and a percentage of technology change;
    determining, by a processor, a change impact score for the activity reflecting an impact of the activity on the resource;
    generating, by the processor, at least one saturation score for the resource from the first start date to the first completion date based on the change impact score for the activity and change impact scores of a first set of activities and events during a first time between the first start date and the first completion date;
    generating a saturation level for resources of the organization based on behavioral and workforce metrics of the organization, wherein the saturation level indicates a level in which the resources of the organization exhibit identified behaviors;
    causing a display of a first window including a graphical representation of the at least one saturation score from the first start date to the first completion date within the graphical user interface on the computer screen, wherein the displayed saturation score indicates that at least one of the saturation scores for the resource is greater than or equal to the saturation level of the organization;
    in response to the at least one of the saturation scores for the resource being greater than or equal to the saturation level of the organization, regenerating the at least one saturation score based on the change impact score for the activity and change impact scores of a second set of activities and events during a second time between a second start date and a second completion date for the activity;
    automatically relocating, by the processor, the regenerated at least one saturation score to correspond with the second start date and the second completion date in the first window;
    causing the regenerated at least one saturation score from the second start date and the second completion date to be displayed in the first window; and
    in response to none of the regenerated at least one saturation scores being at or above the saturation level of the organization during the second start date and the second completion date, electronically linking one or more calendar entries relating to the activity from the linked calendar to an enterprise integrated calendar during the second start date and the second completion date.

2. The computer-implemented method of claim 1, further comprising:
    constantly monitoring whether the at least one saturation score for the resource is greater than or equal to the saturation level of the organization, wherein the display of the first window further includes the saturation level of the organization.

3. The computer-implemented method of claim 2, further comprising automatically returning, by the processor, the relocated at least one saturation score to be displayed from the first start date to the first completion date in response to the at least a portion of the regenerated score of the activity from the second start date to the second completion date being at or above the saturation level of the organization.

4. The computer-implemented method of claim 1, wherein the first set of activities include at least one of: activities, events, projects, vacation time, and holidays, and wherein the resource includes at least one of: funds, employees, groups of employees, sub-groups of employees, an enterprise, building space, or customers.

5. The computer-implemented method of claim 1, wherein a second resource is impacted by the activity, wherein the computer-implemented method further comprises generating at least one saturation score for the second resource and comparing the at least one saturation score to a second saturation level of the organization for the second resource from the first start date to the first completion date.

6. A computer-implemented method comprising:
    receiving, from a device, information associated with an activity for input into an enterprise integrated calendar, the information including a first start date of the activity, a first completion date of the activity, and a resource of an organization expected to be impacted by the activity from the first start date to the first completion date, wherein the information related to the activity includes a percentage of organizational change, a percentage of process change, and a percentage of technology change;
    determining, by a server, a change impact score for the activity based on the first start date, the first completion date, and the resource expected to be impacted by the activity;
    generating, by the server, at least one saturation score for the resource from the first start date to the first completion date based on the change impact score for the activity and change impact scores of one or more of a first set of activities during a first time between the first start date and the first completion date;

generating a saturation level for resources of the organization based on behavioral and workforce metrics of the organization, wherein the saturation level indicates a level in which the resources of the organization exhibit identified behaviors;

causing a display of a first window including a graphical representation of the at least one saturation score from the first start date to the first completion date within a graphical user interface of a computer screen of the device;

comparing, by the server, the at least one saturation score with the saturation level for the resource from the first start date to the first completion date;

in response to determining that the at least one of the saturation scores for the resource is at or above the saturation level of the organization, regenerating the at least one saturation score based on the change impact score for the activity and change impact scores of a second set of activities and events during a second time between a second start date and a second completion date for the activity;

automatically relocating, by the server, the regenerated at least one saturation score to correspond with the second start date and the second completion date in the first window;

causing the regenerated at least one saturation score from the second start date and the second completion date to be displayed in the first window; and in response to none of the at least one saturation scores being at or above the saturation level of the organization, electronically linking one or more calendar entries on a calendar associated with a user of the device to the enterprise integrated calendar, the one or more calendar entries related to the activity.

7. The computer-implemented method of claim 6, further comprising: recommending the second start date and the second completion date for the activity when the at least one of the saturation scores is at or above the saturation level of the organization.

8. The computer-implemented method of claim 7, wherein recommending the second start date and the second completion date further comprises re-generating a series of saturation scores for the resource based on the change impact score for the activity and the change impact scores of the one or more second set of activities from the second start date to the second completion date.

9. The computer-implemented method of claim 6, wherein the activity includes a second start date and a second completion date, wherein the method further comprises determining a second change impact score for the second start date and the second completion date.

10. The computer-implemented method of claim 6, further comprising: generating the saturation level of the organization for the resource from the first start date to the first completion date based on behavioral and workforce metrics, wherein the saturation level indicates a level in which the resources exhibit identified behaviors.

11. The computer-implemented method of claim 6, further comprising:

ranking the activity as a high, medium or low impact based on the change impact score for the resource; and causing a graphical display of a number of activities ranked as high, medium, and low impact based on the change impact score of the activities.

12. The computer-implemented method of claim 6, wherein the first set of activities include at least one of: activities, events, projects, vacation time, and holidays.

13. The computer-implemented method of claim 6, wherein the resource include at least one of: funds, employees, groups of employees, sub-groups of employees, an enterprise, building space, or customers.

14. The computer-implemented method of claim 6, wherein a second resource is impacted by the activity, wherein the method further comprises generating at least one saturation score for the second resource and comparing the at least one saturation score to a second saturation level of the organization for the second resource from the first start date to the first completion date.

15. A non-transitory computer-readable storage medium comprising a set of instructions that, when executed by one or more processors, cause a machine to:

receive, from a device, information associated with an activity for input into an enterprise integrated calendar, the information including a first start date of the activity, a first completion date of the activity, and a resource of an organization expected to be impacted by the activity from the first start date to the first completion date, wherein the information related to the activity includes a percentage of organizational change, a percentage of process change, and a percentage of technology change;

determine a change impact score for the activity based on the first start date, the first completion date, and the resource expected to be impacted by the activity;

generate at least one saturation score for the resource from the first start date to the first completion date based on the change impact score for the activity and change impact scores of one or more of a first set of activities during a first time from the first start date to the first completion date;

generate a saturation level for resources of the organization based on behavioral and workforce metrics of the organization, wherein the saturation level indicates a level in which the resource exhibits identified behaviors;

cause a display of a graphical representation of the at least one saturation score from the first start date to the first completion date within a graphical user interface of the device;

compare the at least one saturation score to the saturation level of the organization for the resource from the first start date to the first completion date;

in response to determining that the at least one of the saturation scores for the resource is at or above the saturation level of the organization, regenerate the at least one saturation score based on the change impact score for the activity and change impact scores of a second set of activities and events during a second time between a second start date and a second completion date for the activity;

automatically relocate the regenerated at least one saturation score to correspond with the second start date and the second completion date in the first window;

cause the regenerated at least one saturation score from the second start date and the second completion date to be displayed in the first window; and in response to none of one or more of the at least one saturation scores being at or above the saturation level of the organization, electronically link one or more calendar entries on a calendar associated with a user of the device to the enterprise integrated calendar, the one or more calendar entries related to the activity.

16. The non-transitory computer-readable storage medium of claim 15, wherein the set of instructions, when executed by the one or more processors, further cause the machine to recommend the second start date and the second completion date for the activity in response to the at least one saturation scores being at or above the saturation level of the organization.

17. The non-transitory computer-readable storage medium of claim 16, wherein the set of instructions that, when executed by the one or more processors, cause the machine to recommend the second start date and the second completion date further cause the machine to re-generate the one or more saturation scores for the resource based on the change impact score for the activity and the change impact scores of the one or more second set of activities from the second start date to the second completion date.

18. The non-transitory computer-readable storage medium of claim 15, wherein the set of instructions, when executed by the one or more processors further cause the machine to cause a graphical display of the at least one saturation score and the saturation level of the organization from at least the first start date to at least the first completion date to remote devices based on a security level or associated group.

19. The method of claim 1, further comprising: tracking workplace attendance and browsing history of one or more resources during various activities that have a corresponding impact on the one or more resources to determine the saturation level of the organization.

20. The computer-implemented method of claim 1, further comprising:
- monitoring RFID clock in and clock out times to detect patterns;
- monitoring the device to determine the resource is searching for other employment; and
- determining the saturation level of the organization based on tracking and correlating when the resource takes unplanned time off, or when workplace satisfaction numbers decline.

* * * * *